United States Patent
Dammon

[11] 3,762,488
[45] Oct. 2, 1973

[54] WHEEL DRIVE UNIT
[75] Inventor: James R. Dammon, Lafayette, Ind.
[73] Assignee: Fairfield Manufacturing Company, Inc., Lafayette, Ind.
[22] Filed: Apr. 13, 1972
[21] Appl. No.: 243,643

[52] U.S. Cl.................. 180/66 F, 91/492, 91/494, 91/496, 91/498
[51] Int. Cl............................................. B60k 7/00
[58] Field of Search..................... 180/66 F; 91/492, 91/496, 498, 495, 494, 491, 481, 472, 197; 92/58

[56] References Cited
UNITED STATES PATENTS

| | | | |
|---|---|---|---|
| 2,386,459 | 10/1945 | Hautzenroeder | 91/498 X |
| 2,397,130 | 3/1946 | Dawson | 91/496 |
| 2,404,305 | 7/1946 | Logus | 91/496 |
| 2,416,940 | 3/1947 | Morton | 91/492 |
| 2,418,123 | 4/1947 | Joy | 180/66 F |
| 3,589,243 | 6/1971 | Bowman | 91/495 X |

FOREIGN PATENTS OR APPLICATIONS

| | | | |
|---|---|---|---|
| 1,111,520 | 7/1961 | Germany | 180/66 F |
| 230,131 | 3/1944 | Switzerland | 91/496 |

Primary Examiner—Benjamin Hersh
Assistant Examiner—Milton L. Smith
Attorney—Thomas P. Jenkins et al.

[57] ABSTRACT

A drive unit for a vehicle which is contained entirely within the wheel hub of the vehicle. A ring gear, fixed internally to the hub, is driven by a plurality of eccentrically rolling pinion gears. Each of the pinion gears is eccentrically rolled by a set of hydraulically actuated pistons disposed in a cylinder block located in the bore of the pinion gears and adapted to move independently and radially outward. The movement of the pistons is controlled by a rotary valve which appropriately ports operating fluid to the radially inward side of the pistons.

12 Claims, 7 Drawing Figures

WHEEL DRIVE UNIT

BACKGROUND OF THE INVENTION

This invention relates to a hydraulically actuated drive unit for the wheel of a vehicle.

Vehicles for specialized use in the fields of agriculture, construction and material handling require drive trains which are capable of a high output torque at fairly low speeds. Conventional transmissions, differential axles and drive shafts have, in some instances, been eliminated in these vehicles by providing a drive unit for the wheels of the vehicle which can be contained in one or more of the wheels on the vehicle. For the most part, these wheel contained drive units have comprised a hydraulic motor which is positioned on the inboard side of the driven wheel and from which extends a driving shaft for driving a reduction gear train disposed in the wheel hub. The hydraulic motor, or motors in the instance where multiple wheel drives are used, is supplied with operating fluid from an engine driven hydraulic pump.

The individual motor driven gear trains used in the wheel drives have the disadvantage that the driving motor must be carried on the inboard side of the wheel hub since the hub itself must be available to house the gear train. Furthermore, due to the plurality of gears required and the coupling between the motor and the gear train, the efficiency of such a drive unit is less than desired.

It is, therefore, highly desirable to provide a wheel drive unit which is much more compact that existing units and, to some degree, has a higher efficiency of operation.

SUMMARY OF THE INVENTION

In accordance with the invention, I provide a wheel drive unit which can be completely contained within the hollow wheel hub of a vehicular wheel.

An internally toothed ring gear is fixed to or formed as part of the inner surface of the wheel supporting hub. The hub, or housing, is rotatably mounted with respect to a mounting portion which mounts the drive unit to the frame or axle of the driven vehicle. A number of externally toothed pinion gears are loosely held in a generally stationary arcuate position within the housing ring gear. The positioning of the pinion gears can be effected by retaining pins which pass through oversized receiving holes in each of the gears or by several crankshafts or the like on which the pinions can be appropriately mounted.

A stationary cylinder block is located within the bore of the pinion gears and is preferably concentric with the housing ring gear. In general, however, the pinion gears, due to their loose mounting, are not held concentric with the cylinder block. The cylinder block contains and supports a number of axially displaced sets of radially movable hydraulic pistons which contact the inner surfaces of the respective pinion gears to force the gears to roll about on their loose mounting pins. The requisite outward movement of the pistons is effected by high pressure operating hydraulic fluid which is successively presented to the radially inward side of each of the pistons in each set by a rotary valve which can be disposed within the cylinder block. The successive movement of the arcuately disposed pistons causes the loosely held pinion gears to roll about on their retaining pins, or on the cranks to bring the teeth on the pinions into meshing engagement with those of the housing ring gear. The rolling pinions force the pistons in contact therewith which are not in communication with the operating fluid back into the cylinder block to push the fluid in the respective cylinders into exhaust ports in the rotary valve. The rolling engagement between the pinions and the housing ring gear causes the housing to be rotatively driven.

The drive for the rotary valve can be eccentrically taken from one of the rolling pinion gears or, in the event a crankshaft is used to support the gears, it can alternately be taken from a gear train driven by one of the rotating crank shafts.

The action of each set of pistons can be appropriately timed with respect to the action of the other sets to compensate for the large imbalance forces which are generated in the drive unit by the eccentric rolling or wobbling of the respective pinion gears. Furthermore, the proper timing of the piston movements to effect the proper rolling movement of the pinion gears can be obtained by the proper eccentrically related rotation of the rotary valve.

The resulting rotation of the housing is thereby effected at a substantially reduced speed when compared with the speed at which the rotary valve must be rotated and is accompanied by a large amount of available torque. This reduced speed and high torque output make the apparatus of the present invention particularly advantageous for use in heavy duty vehicles of the earth moving variety.

BRIEF DESCRIPTION OF THE DRAWINGS

The accompanying drawings illustrate the invention and by way of example, show a preferred embodiment of the invention. In such drawings.

DETAILED DESCRIPTION OF THE PREFERRED EMBODIMENT

Figure 1:
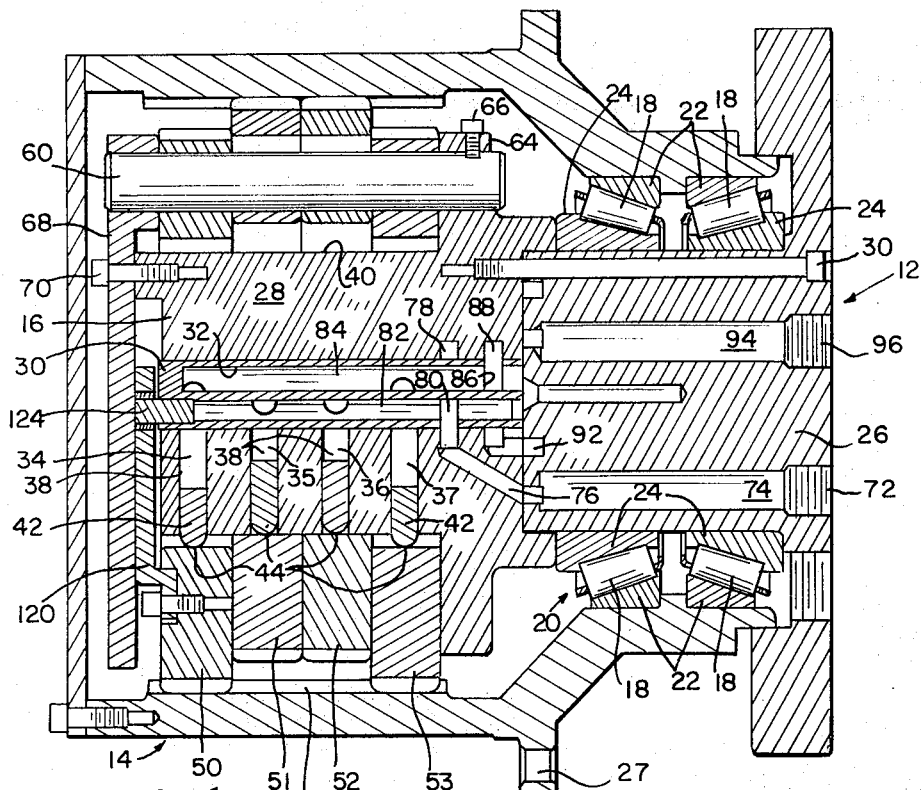
FIG. 1 is a side elevation, in section, of a drive unit embodying the invention.

The wheel housing drive unit shown in FIG. 1 comprises a stationary portion 12 used for mounting the unit on the axle or frame of a vehicle, a rotary housing 14 for supporting a wheel of the vehicle and for enclosing a drive unit 16. The rotational support for the housing 14 is provided by a plurality of roller bearings 18 which are mounted in and supported by conical bearing supports 20 one half of which 22 is mounted on the inner circumference of the rotary housing 14 and the other half of which 24 is mounted on a hydraulic junction block 26 which is fixed to or can be formed as part of the stationary mounting portion 12.

The housing 14 forms the mounting support for a vehicle wheel (not shown) which is held thereon using bolt holes 27 formed in a mounting flange 29 extending from the housing 14.

A stationary cylinder block 28 forms the center portion of the drive unit 16 and is bolted onto the outward end of the hydraulic junction block 26 by arcuately disposed bolts 30 or, in the alternative, the cylinder block can be formed as an integral part of the hydraulic junction block 26. The cylinder block 28 is generally cylindrical in shape and is concentrically positioned within the rotational housing 14. A rotary valve 30 is supported for rotation with a central passage 32 in the cylinder block 28. The cylinder block 28 also has four sets 34 through 37 of radially extending piston cylinders 38 which extend from the central passage 32 to and through the outer wall 40 of the block 28. Each of the cylinders 38 in each cylinder set 34 through 37 has a hydraulic piston 42 disposed therein. The rounded outer end 44 of each piston 42 in each set of pistons 34 through 37 abuts a circumferential face 46 at the bottom of a channel 48 formed in the bore of a respective externally toothed pinion gear 50 through 53.

The pinion gears 50 through 53 are surrounded by a common internally toothed ring gear 56 which is fixed to or formed as part of the inner surface of the housing 14. The pinions 50 through 53 have a pitch circle which is smaller than that of the ring gear 56 so that each pinion must be moved radially to effect a meshing between its teeth and those of the ring gear. The pinion gears 50 through 53 all have the same number of teeth.

The pinion gears 50 through 53 are loosely supported on five pins 60 which pass through oversized passages in the gears at arcuately disposed positions. Preferably, these passages 62 are equally spaced around the gears 50 through 53. The looseness of the support allows free yet restrained radial movement of the pinions so that they can appropriately mesh, as will be explained, with the ring gear 56. The retaining pins 60 are supported at one end within a flange 64 formed as part of the cylinder block 28. Cap screws 66 are used to prevent rotation of the retaining pins 60 within the flange 64. The other ends of the retaining pins 60 are similarly supported by an end plate 68 which itself is stationarily fixed by screws 70 to the valve block 28.

Hydraulic fluid is supplied from a pump (not shown) through an inlet port 72 to a working fluid supply passage 74 in the hydraulic junction block 26. The forward end of the supply passage 74 is in communication with a similar passage 76 in the stationary valve block 28. The valve block passage 76 has a smaller diameter than the passage 74 in the junction block 26 for increasing the pressure of the hydraulic fluid supplied to a circumferentially extending supply groove 78. This supply groove 78 communicates with a radial passage 80 in the rotary valve 30 which terminates in a longitudinal passage 82 extending almost the full length of the rotary valve 30.

In a similar manner, a longitudinal and internal exhaust fluid passage 84 within the rotary valve 30 terminates in a radial port 86 which is in communication with a circumferential groove 88 formed in the inner wall of the valve passage 32. Exhaust fluid flowing from the groove 88 passes through a passage 90 in the valve block 28 and into a circuitous groove 92 which is in communication with an exhaust passage 94 in the hydraulic junction block and which intersects the back face of the junction block 26 in an exhaust port 96. Both the inlet port 72 and the exhaust port 96 can be threaded, as shown, for the fitting of appropriate hydraulic fittings therein.

With particular reference to FIGS. 2 through 5, the operating fluid supply passage 82 is able, as the valve 30 is rotated by means to be described, to communicate with each of the cylinders 38 in each set of cylinders 34 through 37. This communication is made possible by cross port holes 98 through 101 in the valve 30 which join the inner operating fluid passage 82 with the surface of the valve 30 and thereby with the respective cylinders 38. The cross ports 98 through 101 do, however, intersect the surface of the valve 30 in recesses, two of which 102 and 103 are on one side of the valve and the other two of which 104 and 105 are 180° away on the opposite side of the valve.

In a similar manner, the exhaust passage 84 within the valve 30 communicates with the remaining top two recesses 106 and 107 and with the remaining bottom two recesses 108 and 109 by exhaust cross ports 112 through 115 to provide exhaust passages for fluid leaving the respective cylinders 38. The location of the supply and exhaust ports thereby forms four sets of two ports each having an exhaust port and an inlet port, the openings of which are 180° apart. These sets of ports are separated by shoulders 110 which completely isolate, for purposes of operation, the incoming and outgoing fluid for each set of cylinders 34 through 37.

Figure 2:
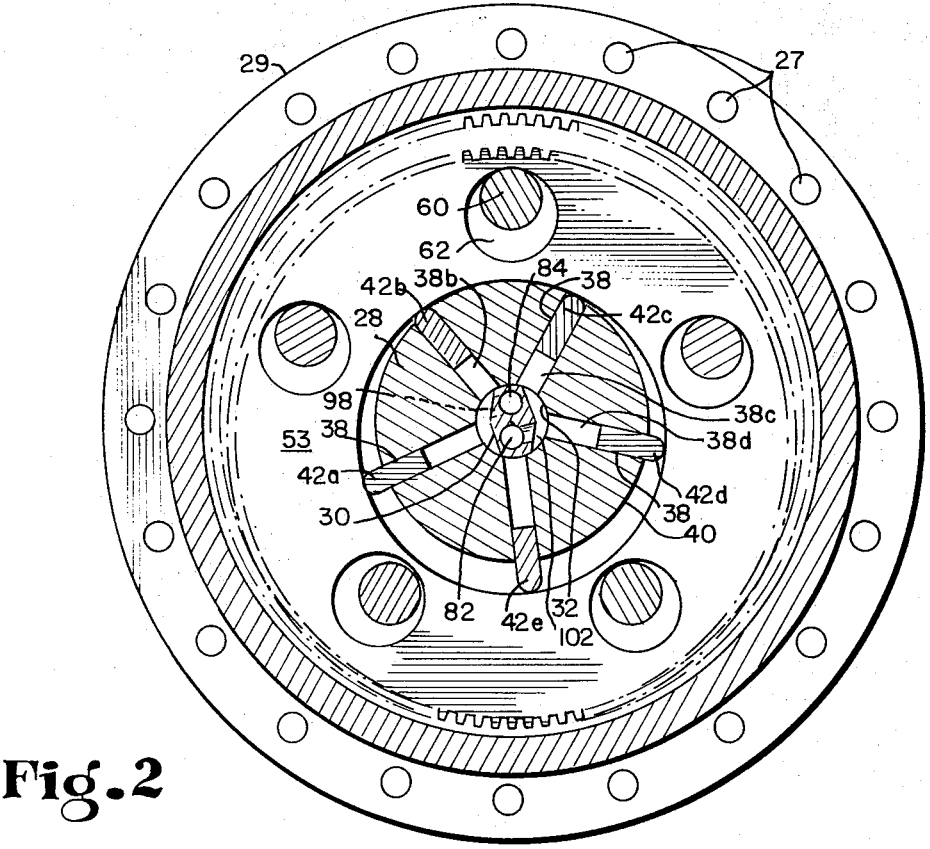
FIG. 2 is a sectional view of the drive unit shown in FIG. 1.
Figure 4:
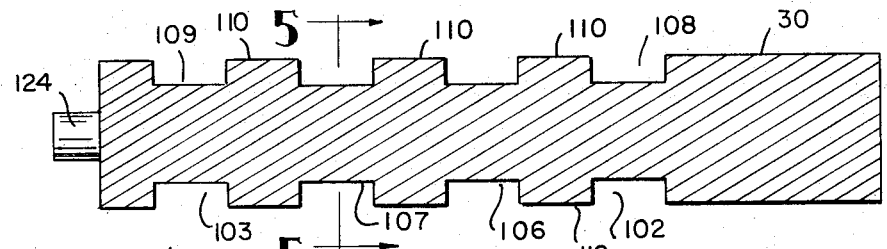
FIG. 4 is a sectional view taken along line 4—4 of FIG. 3.
Figure 3:
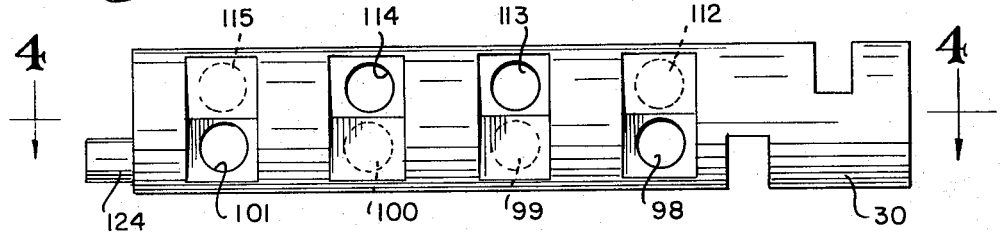
FIG. 3 shows a top view of a rotary valve for use in the invention.
Figure 5:
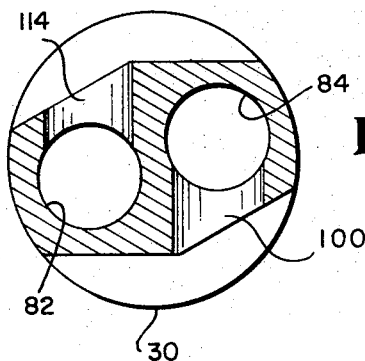
FIG. 5 is a sectional view taken along line 5—5 of FIG. 4.

With particular reference to FIG. 2 showing the operation of one pinion gear 53, which will be used as representative for the operation of all four gears 50 through 53, as the valve 30 is rotated, pressurized fluid is available from the supply passage 82 through the cross inlet port 98 to the entire recess 102 in the valve 30. This fluid is thereby available to two of the cylinders 38a and 38b, but it should be noted that the recess 102 is in entire communication with the first cylinder 38a and in only partial communication with the second cylinder 38b. The piston 42a in the first cylinder 38a is thereby proportionately forced outwardly as is the piston 42b in the second cylinder 38b. The respective outward thrusts are proportional to the pressure of the fluid available to the cylinders at any given time. The outward and forced movements of the pistons 42a and 42b cause the pinion gear 53 to roll accordingly into meshing engagement with the ring gear 56.

At the same time, two other cylinders 38c and 38d are in partial and complete communication, respectively, with the exhaust port 112 and thereby the exhaust fluid passage 84. The gear 53, as it is moved by the first two pistons 42a and 42b, forces the pistons 42c and 42d in the latter two cylinders 38c and 38d inwardly and causes the fluid contained in those cylinders to be forced into the exhaust passage 84.

A fifth cylinder 38e is closed off by the valve body 30 at the instant shown, so that the piston 42e disposed therein is temporarily motionless, but is at its outward most radial position.

Each piston 42 in each set of pistons 34 through 37 is successively and proportionately moved outwardly and inwardly in their respective cylinders as the valve 30 is rotated. Each of the pinion gears 50 through 53 is caused, by this piston movement, to progressively roll in and out of engagement with the ring gear 56. The rolling movement impressed on the pinion gears 50 through 53, and the resulting engagement between the external teeth on the pinion gears 50 through 53 and the internal ring gear teeth 58, imparts a rotation to the housing 14 which is concentric with the center of the valve body 28. The theoretical center of rotation of the pinion gears 50 through 53, however, is, as it rolls about on the retaining pins 60, eccentric with the valve body 28 and forms a circle about the center of the retaining pins 60.

Figure 6:
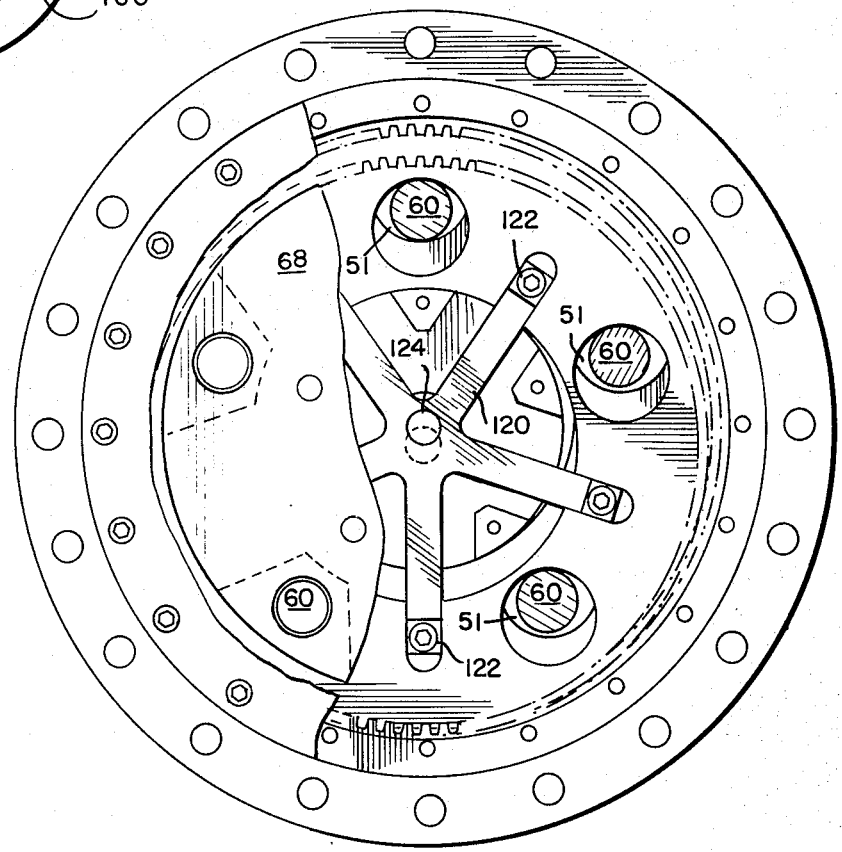
FIG. 6 is a partial sectional view of the means for rotating the valve.

To ensure the eccentric wobbling motion of each of the pinion gears 50 through 53, the valve 30 is eccentrically driven by a spider 120, shown in FIG. 6, which is mounted, as by screws 122, to the outward most pinion gear 50. A driver pin 124 is eccentrically fixed to the spider 120 and is also eccentrically fixed to the valve body 30 to rotatively drive the valve in eccentrically timed relationship with respect to the rotating housing 14.

The use of four pinion gears 50 through 53 has been found advantageous to provide a high transfer of torque to the rotating housing 14. The cross inlet ports 99 and 100 in the valve 30 supplying the piston cylinder sets 35 and 36 for these two gears are located 180° away from the inlet ports 98 and 101 controlling the operation of the other two pinion gears 50 and 53. The thrust of the middle two gears 51 and 52 is thereby displaced by 180° from the operation of movement of the outer two gears 50 and 53 which thereby counteracts the large amount of imbalance incurred in the overall drive unit by the eccentrically wobbling gears.

Figure 7:
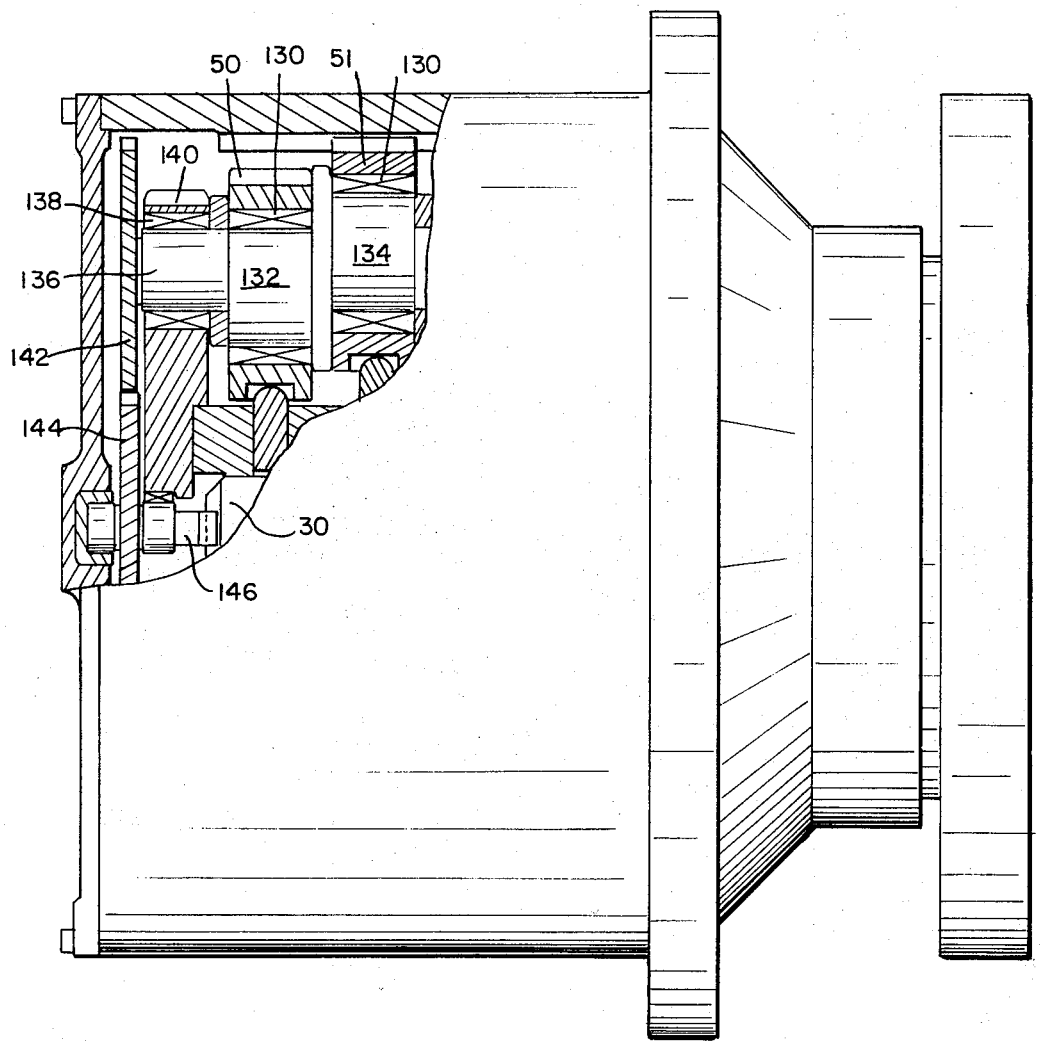
FIG. 7 is a side view, partially in section, showing an alternate drive for the rotary valve.

An alternate method for supporting the pinion gears 50 through 53 and for rotating the rotary valve 30 is shown in FIG. 7. In this embodiment, the pinion gears are supported by bearings 130 on different cranks 132 and 134, only two being shown in FIG. 7, of a crankshaft 136. The different cranks, 132 and 134, provide the eccentricity for the pinion gears 50 and 51 to roll into and out of meshing engagement with the housing ring gear 56 in the same manner in which the pinions 50 through 53 rolled about the retaining pins 60 in the drive unit shown in FIG. 1.

The crankshaft 136 is supported at its ends by bearings 138 which are mounted in flanges 140 formed as part of the cylinder body 28. A thin gear 142 is mounted on and rotated by the crankshaft as it is turned by the rolling movement of the pinions gears 50 through 53. The crankshaft driven gear 142 drives a second gear 144 which is centrally attached to a valve driver 146. The rotation of the valve is effected by the rotation of this driver 146 to which it is coupled.

The present invention has been found to be capable of high torque outputs at fairly low speeds. While pressurized hydraulic fluid is the only input to the drive unit, a speed reduction takes place as a result of the eccentric rolling action of the pinion gears. In effect, the speed of the housing is substantially less than the speed at which the pinion gears roll and, the speed at which the rotary valve is rotated. This reduction between the speed of the valve and the speed of the housing is equal to the number of teeth in the housing ring gear divided by the difference in teeth between the ring gear and one of the pinion gears. It should be noted that all of the pinion gears have the same number of teeth. The output torque is a function of this speed reduction, the pressure of the applied operating fluid and the displacement of the pistons.

While the invention has been described and explained as having four pinion gears, the scope of the invention is not left if more or fewer such gears are utilized. The only restriction is that at least two must be used to provide suitable balancing of the large eccentrical forces which are generated.

I claim:

1. A wheel drive unit for a vehicle, which comprises a housing having an internally toothed ring gear fixed thereto; first and second externally toothed pinion gears having a smaller pitch circle than that of said ring gear; means for loosely mounting said first and second pinion gears within said ring gear thereby permitting said first and second pinion gears to roll into and out of meshing engagement with said ring gear; a stationary cylinder block located in the bores of said first and second pinion gears and having a first and second set of cylinders, said first set of cylinders being associated with said first pinion gear and said second set of cylinders being associated with said second pinion gear; each of said first and second sets of cylinders including a plurality of radially extending cylinders; a plurality of radially movable pistons disposed in said cylinders in said first and second cylinder sets; the radially outward end of said pistons being in contacting relationship with said first and second pinion gears; valve means for successively supplying operating fluid to the radially inward side of said pistons in a predetermined sequence, whereby said pistons effect a rolling of said first and second pinion gears on said means for loosely mounting said first and second pinion gears to meshingly engage said ring gear to cause said housing to rotate.

2. A wheel drive unit for a vehicle as claimed in claim 1, wherein said valve means includes a cylindrical valve body disposed in said cylinder block; a supply passage in said body; a first and second supply port in said body each of which communicates with said supply passage; and driving means coupled to said valve body for rotating said body to bring said first and second supply ports into successive communication with said cylinders in said first and second cylinder sets to effect movement of said pistons.

3. A wheel drive unit for a vehicle as claimed in claim 2, wherein said first supply port communicates with said cylinders in said first cylinder set at an arcuately disposed location from where said second supply port communicates with said cylinders in said second cylinder set as said valve body is rotated whereby the rolling of said first pinion gear is out of phase with the rolling of said second pinion gear.

4. A wheel drive unit for a vehicle as claimed in claim 3 wherein said driving means includes a spider which is connected to one of said first and second pinion gears and is eccentrically connected to said valve body whereby said valve body is rotated as said pinion gear is rolled.

5. A wheel drive unit for a vehicle as claimed in claim 1 wherein said means for loosely mounting said first and second pinion gears includes a plurality of stationary cylindrical pins which pass through a plurality of circular holes in said pinion gears which have a diameter greater than the diameter of said pins.

6. A wheel drive unit for a vehicle as claimed in claim 3, wherein said means for loosely mounting includes a crankshaft.

7. A wheel drive unit for a vehicle, which comprises a housing having an internally toothed ring gear fixed therein; a plurality of externally toothed pinion gears having a smaller pitch diameter than the pitch diameter of said ring gear; means for supporting said pinion gears and permitting radial movement thereof, a stationary cylinder block located within the bore of said plurality of pinion gears whereby said pinion gears surround said cylinder block; a plurality of sets of cylinders in said block, each of said sets being operatively associated with one of said pinion gears in said plurality of pinion gears and each of said sets including a multiplicity of arcuately disposed and radially extending cylinders; a plurality of radially movable pistons, one of said pistons being disposed in each of said cylinders; the pistons in each of said cylinder sets being operatively connected to the pinion gear associated therewith, rotary valve means disposed in said cylinder block and having a supply fluid passage therein for supplying operating fluid to said cylinders; means to rotate said valve means so that said supply passage is caused to successively communicate with each of said pistons, whereby each of said pistons is caused by said operating fluid to move radially outward thereby forcing said pinion gears into and out of meshing engagement with said ring gear.

8. A wheel drive unit as claimed in claim 7 wherein said housing comprises a wheel hub.

9. A wheel drive unit as claimed in claim 7 wherein said means for supporting said pinion gears includes a plurality of arcuately disposed holes in said pinion gears which receive therethrough a plurality of supporting pins, each of said pins having a diameter which is less than the diameter of the corresponding receiving hole; and wherein said means to rotate said valve means includes a spider coupled to said valve means and to one of said pinion gears.

10. A wheel drive unit as claimed in claim 7 wherein said means for supporting said pinion gears includes a plurality of arcuately disposed crankshafts; and wherein said means to rotate said valve means includes a gear train driven from said crankshaft and coupled to said valve means.

11. A wheel drive unit as claimed in claim 7 wherein said rotary valve means includes a supply port in communication with said supply passage for each of said plurality of cylinder sets; said supply port passages being so arcuately disposed that said pinion gears are not caused by said pistons to move in phase with one another.

12. A wheel drive unit as claimed in claim 7 wherein said plurality of pinion gears comprises four pinion gears; said plurality of sets of cylinders comprises four sets of cylinders and said rotary valve means includes a valve body having four cross port passages therein in communication with said supply passage, one being in communication with each of said four sets of cylinders as said valve means is rotated by said means to rotate said valve means, wherein two of said cross port passages communicate with two of said sets of cylinders in a relative arcuate position different from that of the two sets of said cylinders with which the other two cross port passages are in communication.

* * * * *